United States Patent Office 3,264,297
Patented August 2, 1966

3,264,297
PROCESS FOR THE MANUFACTURE OF LINEAR QUINACRIDONES
Henri Streiff, Birsfelden, Switzerland, assignor to Ciba Limited, Basel, Switzerland, a company of Switzerland
No Drawing. Filed May 31, 1961, Ser. No. 113,956
Claims priority, application Switzerland, June 7, 1960, 6,460/60
7 Claims. (Cl. 260—279)

Many processes are known for subjecting 2:5-di-(arylamino)-terephthalic acids to ring closure to form quinacridones. There have been used as agents for bringing about ring closure zinc chloride, phosphorus pentachloride, phosphorus pentoxide, aluminum chloride and boric acid. However, all these condensing agents have the disadvantage that they cannot be used for the production of quinacridones on an industrial scale. Polyphosphoric acids have also been used as agents for bringing about ring closure. The use of this agent leads to good results, but complicated plant is required for regenerating the costly polyphosphoric acid. The heating of 2:5-dinaphthylamino-terephthalic acids with sulfuric acid is a good method of producing dibenzquinacridones but, for the production of the usual quinacridones from 2:5-diphenylamino-terephthalic acids this method requires the use of so high a temperature to bring about ring closure that sulfonation takes place at the same time. In order to split off the sulfo groups, it is necessary to treat the products with a dilute acid at a high temperature, and this involves considerable difficulty with regard to the apparatus used. In the original publication of Liebermann concerning the formation of quinacridones from 2:5-diarylamino-terephthalic acids (Liebigs Annalen, vol. 518, page 245, 1935) is also mentioned the use of benzoyl chloride as a ring-closing agent for the production of dibenzquinacridones from 2:5-dinaphthylamino-terephthalic acids. However, on page 247 of this publication it is expressly stated that 2:5-diphenylamino-terephthalic acids are merely benzoylated by benzoyl chloride, and that ring closure cannot be brought about.

The present invention is based on the unexpected observation that 2:5-diarylaminoterephthalic acids can be subjected to ring closure to form the corresponding quinacridones in good yield by heating the 2:5-diarylamino-terephthalic acid with an aryl-carboxylic acid halide in the presence of a high boiling inert diluent.

As starting materials there are advantageously used 2:5-diphenylamino-terephthalic acids which may contain further substituents in the benzene nuclei, except in at least one ortho-position relatively to the —NH— group, for example, halogen atoms or alkyl, alkoxy or nitro groups.

As examples there may be mentioned:

2:5-diphenylamino-terephthalic acid,
2:5-diphenylamino-terephthalic acid esters and especially substituted 2:5-diphenylamino-terephthalic acids such as
2:5-di-(methylphenylamino)-terephthalic acids,
2:5-di-(methoxyphenylamino)-terephthalic acids,
2:5-di-(halogenphenylamino)-terephthalic acids,
2:5-di-(nitrophenylamino)-terephthalic acid,
2:5-di-(2':4'-dimethylphenylamino)-terephthalic acid,
2:5-bis-(4'-diphenylamino)-terephthalic acid,
2:5-dianilido-2':4':2'':4''-tetrachlorterephthalic acid,
2:5-di-(α- or -β-naphthylamino)-terephthalic acid.

The process of the invention also includes subjecting to ring closure asymmetrically substituted di-(arylamino)-, and especially di-(phenylamino)-terephthalic acids, for example, compounds in which only one phenyl nucleus is substituted or in which both phenyl nuclei are substituted but differ from each other in the position or nature of the substituents.

It is also possible to subject to ring closure mixtures of two or more different symmetrically substituted diarylamino-terephthalic acids, or mixtures of symmetrical substituted and non-substituted diarylamino-terephthalic acids to form homogeneous mixtures of differently substituted quinacridones, and under favourable conditions a more or less complete formation of mixed crystals may occur.

The aforesaid terephthalic acids or derivatives of terephthalic acids can be made by known methods, for example, by the condensation of succinylo-succinic acid esters with arylamines, especially aniline or substituted anilines, followed by oxidation and hydrolysis.

As aryl-carboxylic acid halides to be used in the process there may be mentioned more especially aryl-carboxylic acid chlorides, for example, naphthoic acid chlorides, and advantageously benzene carboxylic acid chlorides, for example, chlorobenzoic acid chloride, and especially benzoyl chloride. There are advantageously used at least 2 mols, for example, 2 to 3 mols, of the arylcarboxylic acid halide for each mol of 2:5-diarylamino-terephthalic acid.

As high boiling inert diluents there may be mentioned, for example, nitrobenzene, o-dichlorobenzene and trichlorobenzene. In order to avoid loss of the aryl-carboxylic acid halide used, the diluent is advantageously used in a substantially anhydrous form. There is advantageously used at least one part of diluent to one part of the diarylamino-terephthalic acid. The reaction temperature is advantageously at least 100° C., for example, 130° C. or higher, and is advantageously within the range of 170° C. to 250° C. At these high temperatures the ring closure is usually complete within a few hours, whereas at lower temperatures the reaction period may be from 15 to 30 hours or more. As the quinacridones formed are insoluble in the diluent they can be isolated from the reaction mixture by filtration. By washing the filter residue with hot solvent impurities present can be removed. By reprecipitating the crude product from concentrated sulfuric acid, whereby a change in the crystal modification generally occurs, an especially pure pigment is obtained which may be brought into a fine state of subdivision by known methods, during which a change in the crystal modification may occur, and can be used for pigmenting a very wide variety of materials.

The following examples illustrate the invention the parts and percentages being by weight unless otherwise stated, and the relationship of parts by weight to parts by volume being the same as that of the kilogram to the liter.

*Example 1*

A mixture of 7.52 parts of 2:5-di-(para-toluidino)-terephthalic acid, 150 parts by volume of ortho-dichlorobenzene and 13 parts by volume of benzoylchloride is stirred and heated for 15 hours at 170 to 180° C.; in the beginning the reaction mixture turns yellow and a strong evolution of hydrochloric gas is observed. After only a few hours the dimethylquinacridone corresponding to p-toluidine begins to crystallize. Finally, the mixture is suction-filtered while still hot, and the violet filter residue is washed with hot ortho-dichlorobenzene and with hot alcohol, and then dried under reduced pressure at 50 to 60° C. Yield: 5.1 parts=75% of the theoretical.

When the reaction time is shortened to 5 hours, over 50% of the theoretical yield of pure, crystalline dimethyl-quinacridone are obtained.

By reprecipitation from sulfuric acid (that is to say, dissolving in concentrated sulfuric acid, precipitation by dilution with water to an acid concentration of about 80%, filtration and washing with water until free from acid) it is possible to remove a very small amount of impurities which may have been left behind after washing with hot solvents.

When the crystalline pigment is finely dispersed by a known method, very pure, red-violet tints of excellent fastness to light and solvents can be produced, for example in polyvinylchloride foils or in lacquers. No change in the crystal modification is observed either on recrystallization from sulfuric acid or by conventional conditioning in the presence of an organic or inorganic diluent.

*Example 2*

A mixture of 7.52 parts of 2:5-di-(para-toluidino)-terephthalic acid, 150 parts by volume of ortho-dichlorobenzene and 13 parts by volume of benzoylchloride is stirred while being heated to 140° C. In the course of about 30 to 60 minutes a clear yellow solution is formed, accompanied by evolution of hydrochloric acid gas. When, for example after 3 to 4 hours, a small specimen of the reaction mixture is examined under a microscope, red, small crystals grouped in star form of the dimethylquinacridone corresponding to para-toluidine can be observed, which are embedded in the yellow intermediate product which has precipitated on the cold slide carrier by quenching and which is of indistinctly crystalline structure. By continuing the heating for several hours at about 170 to 180° C., the formation of the dimethylquinacridone is completed; the termination of the cyclisation reaction is indicated by the fact that no more yellow particles appear on the cold slide carrier of the microscope; instead, there are found uniform bluish red crystals joined in hedgehog-like clusters of about 20 to 50µ diameter. By working up as described in Example 1 there can be isolated, for example after a reaction period of 20 hours at 180° C., 5.34 parts (=78.5% of the theoretical yield) of dimethylquinacridone.

*Example 3*

When a mixture of 7.52 parts of 2:5-di-(para-toluidino)-terephthalic acid, 150 parts by volume of nitrobenzene and 6 parts by volume of benzoylchloride is heated to 140° C. for about ½ hour, a clear yellow solution is obtained, accompanied by a strong evolution of hydrochloric acid gas. When this solution is stirred for about 15 to 20 hours at 190 to 200° C., a suspension of violet-claret color is obtained. Under a microscope uniform red crystals can be observed which are partly joined in hedgehog-like clusters or appear in the form of monocrystals of a length of up to about 15µ. Working up as described in Example 1 yields 6.59 parts of dimethylquinacridone. This crude product still contains about 10% of impurities which can be removed by extraction with hot aqueous-alcoholic alkali solution. When the crude product is dissolved in concentrated sulfuric acid and diluted with water to an acid concentration of about 80%, a crystalline product is obtained in bluish green needles which, after having been washed free from acid with water, yields the pure dimethylquinacridone in red needles of 20 to 30µ length in a yield exceeding 80%.

*Example 4*

A mixture of 6.96 parts of 2:5-dianilino-terephthalic acid, 13 cc. of benzoylchloride and 150 cc. of nitrobenzene is heated for 1 hour at 140° C., whereupon a clear deep-yellow solution is formed and hydrochloric acid gas escapes. This solution is then stirred at 190 to 200° C. until in a small specimen of the reaction mixture on a cold slide carrier small yellow particles can no longer be detected, which is the case after about 10 to 15 hours. Working up as described in Example 1 yields 5.75 parts of linear quinacridone from which 13% of impurities can be removed by extraction with aqueous-alcoholic alkali hydroxide solution. After recrystallization from sulfuric acid (that is to say, dissolving in concentrated sulfuric acid, precipitation by dilution with water to an acid concentration of about 80%, filtration, thorough washing with water) the pure α-modification is obtained from the pigment in a yield of 4.78 parts.

The reaction takes a similar course and gives a comparable yield when instead of nitrobenzene an equal volume of trichlorobenzene is used as solvent.

*Example 5*

A mixture of 6.96 parts of 2:5-dianilino-terephthalic acid, 150 parts by volume of nitrobenzene and 6 parts by volume of benzoylchloride is stirred for 2 hours at 130° C. With strong evolution of hydrochloric acid gas a yellow solution is formed which is stirred on for 15 to 20 hours at 190 to 200° C. The linear quinacridone begins to separate in crystalline form already during the heating-up. Finally, working up as described in Example 1 yields 5.5 parts (=88.2% of the theoretical yield) of crude quinacridone which, on purification and recrystallization according to Example 4, yields 5.07 parts (=81.3% of the theoretical yield) of pure quinacridone of the α-modification.

*Example 6*

A mixture of 139.2 parts of 2:5-dianilino-terephthalic acid, 500 parts by volume of nitrobenzene and 182 parts of para-chlorobenzoylchloride is stirred and heated for 6 hours at 140 to 150° C., then for another 4 hours at 155 to 165° C. and finally for 5 hours at 170 to 180° C. After cooling to 100° C., 150 parts by volume of sodium hydroxide solution of 30% strength are added and the nitrobenzene is distilled off with steam; during the distillation it is ensured by a suitable control of the temperature that finally an aqueous suspension containing about 5% of pigment is obtained. The whole is suction-filtered, the filter cake is washed with hot water and then dried under vacuum at 90 to 100° C., to yield 124.35 parts of crude quinacridone (=99.6% of the theoretical yield). After acidification of the aqueous-alkaline filtrate 95% of the theoretical yield of para-chlorobenzoic acid can be isolated.

Recrystallization from sulfuric acid as described in Example 4 furnishes pure α-quinacridone in a yield of 104 parts, making a total yield of 83.4% of the theoretical.

When the afore-mentioned para-chlorobenzoylchloride is replaced by a commercial mixture of isomeric chlorobenzoylchlorides of known acid chloride content, an identical result is obtained.

*Example 7*

A mixture of 34.8 parts of 2:5-dianilino-terephthalic acid, 150 parts by volume of nitrobenzene and 30 parts by volume of benzoylchloride is stirred for 64 hours at 100 to 110° C. The reaction mixture is then suction-filtered, and the filter residue is washed with hot nitrobenzene and with hot alcohol and dried under reduced pressure, to yield 15.83 parts of a very impure quinacridone from which pure α-quinacridone can be isolated by extraction with aqueous-alcoholic alkali solution and recrystallization from sulfuric acid.

*Example 8*

A mixture of 139.2 parts of 2:5-dianilino-terephthalic acid, 250 parts by volume of nitrobenzene and 100 parts by volume of benzoylchloride is stirred while being heated for 6 hours at 140 to 150° C., then for another 3 hours at 150 to 160° C. and finally for 5 hours at 170 to 180° C. After cooling to 100° C., 50 parts by volume of sodium hydroxide solution of 30% strength are slowly added, and the resulting thick paste is flushed with hot water into a steam distillation vessel equipped with a stirring means. Another 100 parts by volume of sodium hydroxide solution of 30% strength are added, the nitrobenzene is removed by steam distillation, and the residue is suction-filtered, washed with hot water and dried under vacuum at 90 to 100° C. The crude quinacridone thus obtained in a quantitative yield is then recrystallized from sulfuric acid by dissolving it in 1250 parts of cold concentrated sulfuric acid, adding water dropwise until an acid concentration of 75 to 80% has been reached, while cooling with ice, followed by suction-filtration and reaction with water. The residue is filtered off, dried under vacuum at 90 to 100° C., and yields 111 parts (=89% of the theoretical yield) of pure α-quinacridone.

When instead of 100 parts by volume of benzoylchloride only 92.5 parts by volume thereof are used, the yield of α-quinacridone drops to 79% of the theoretical.

*Example 9*

A mixture of 34.8 parts of 2:5-dianilino-terephthalic acid and 200 parts by volume of nitrobenzene is heated to the boil while being stirred and about 30 to 50 parts by volume of nitrobenzene are distilled off. After cooling to 140°, 24 parts by volume of benzoylchloride are added dropwise in the course of ½ hour, and the reaction mixture is then stirred for 20 hours at 140 to 150° C. Working up as described in Example 7 yields 22.6 parts (=72.5% of the theoretical yield) of a α-quinacridone.

*Example 10*

A mixture of 34.8 parts of 2:5-dianilino-terephthalic acid, 30 parts by volume of benzoylchloride and 200 parts by volume of 1-chloronaphthalene is stirred and heated for 2 hours at 245 to 255° C. The reaction mixture is then worked up as described in Example 7 and gives a yield of 19.2 parts (=61.5% of the theoretical) of α-quinacridone.

Similar yields are obtained under identical conditions by using instead of 1-chloronaphthalene an equal volume of "Dowtherm A" (a mixture of about 23.5% of diphenyl and about 76.5% of diphenyloxide).

*Example 11*

A mixture of 34.8 parts of 2:5-dianilino-terephthalic acid, 150 parts by volume of commercial anhydrous trichlorobenzene and 30 parts by volume of benzoylchloride is stirred for 14 hours at 190 to 200° C. Working up as described in Example 7 gives a yield of 78.9% of the theoretical of α-quinacridone.

When the identical batch is stirred for 5 hours at 220 to 230° C. and then suitably worked up, it gives a yield of 75.3% of the theoretical of crystalline α-quinacridone.

*Example 12*

A mixture of 75.2 parts of 2:5-di-(para-toluidino)-terephthalic acid, 500 parts by volume of nitrobenzene and 55 parts by volume of benzoylchloride is heated for ½ hour at 140–150° C., whereupon a clear, yellow solution is obtained which is stirred for another 14 hours at 190 to 200° C.; the claret colored suspension is then suction-filtered, washed with hot nitrobenzene and the filter residue is treated with 20 parts by volume of sodium hydroxide solution of 30% strength and then freed from nitrobenzene by steam distillation. The filter cake is suctioned off and dried under reduced pressure, to furnish dimethylquinacridone in a substantially quantitative yield. Recrystallization from sulfuric acid—advantageously diluting to an acid content of 85%—gives a yield of 83% of the theoretical of pure, finely crystalline dimethylquinacridone.

*Example 13*

A mixture of 41.7 parts of 2:5-di-(para-chloranilino)-terephthalic acid, 150 parts by volume of nitrobenzene and 30 parts by volume of benzoylchloride is stirred and heated for 1 hour at 140 to 150° C., whereupon a clear yellow solution is obtained. Heating for another 15 hours at 190 to 200° C. gives rise to a pigment suspension which is suctioned off, washed with hot nitrobenzene and with hot alcohol, and the filter cake is dried under vacuum at 90 to 100° C. The dichloroquinacridone is obtained in a completely pure form by crystallization from 100% sulfuric acid, advantageously diluting to an acid concentration of about 88%; this is accompanied by a change in modification which, however, can be reversed by subsequent conditioning, for example by grinding in a ball mill with acetone and subsequent evaporation of the solvent. When incorporated by rolling in polyvinylchloride the conditioned dichloroquinacridone produces very pure and strong violet colorations of considerable fastness to light. Yield: 81.5% of the theoretical.

When in the above example the 41.7 parts of 2:5-di-(para-chloranilino)-terephthalic acid are replaced by 40.8 parts of 2:5-di-(para-anisidino)-terephthalic acid, all other conditions being identical, a similar yield of the corresponding dimethoxyquinacridone is obtained. Also in this case recrystallization of the crude pigment from 100% sulfuric acid produces a change in modification which can be reversed by conditioning. The ground pure pigment colors polyvinylchloride foils very fast bluish violet tints.

A selection of further substituted quinacridones accessible by the methods described in the preceding examples are listed in the following table. Although most of these substitution products exist in more than one crystal modification, the tints shown in the table are those produced by quinacridones before recrystallization from sulfuric but after having been extracted and conditioned.

Quinacridones from symmetrical 2:5-diarylaminoterephthalic acids:

| Example | Arylamine | Tint |
|---|---|---|
| 1 | 2-chloraniline | Orange-red. |
| 2 | 2:4-dichloraniline | Do. |
| 3 | 2:5-dichloraniline | Do. |
| 4 | 2:4-dimethylaniline | Bluish red. |
| 5 | 3:5-dimethylaniline | Orange-red. |
| 6 | 4-phenylaniline | Blue. |
| 7 | 2-methyl-4-chloraniline | Bluish red. |
| 8 | 1-naphthylamine | Orange. |
| 9 | 2-naphthylamine | Do. |
| 10 | 4-ethoxyaniline | Blue. |
| 11 | 4-phenoxyaniline | Violet. |
| 12 | 4-cyclohexylaniline | Bluish red. |
| 13 | 1-aminoanthracene | Orange. |
| 14 | 2-aminoanthracene | Orange-yellow. |
| 15 | 4-amino-diethylaniline | Greyish blue. |
| 16 | 3-methoxyaniline | Orange. |
| 17 | 2-isopropylaniline | Bluish red. |
| 18 | 2:5-dimethoxy-4-benzoylaminoaniline | Violet. |
| 19 | 2-ethoxy-4-methylaniline | Red. |
| 20 | 2-methylaniline | Do. |
| 21 | 3-chloraniline | Bluish red. |
| 22 | 2-methyl-3-chloraniline | Orange-red. |
| 23 | 2-phenoxyaniline | Violet red. |
| 24 | 2-fluoraniline | Orange. |

*Example 14*

A mixture of 13.9 parts of 2:5-di-(ortho-chloranilino)-terephthalic acid, 23.2 parts of 2:5-dianilino-terephthalic acid, 500 parts by volume of nitrobenzene and 30 parts by volume of benzoylchloride is heated for 6 hours at 140 to 150° C., then for 3 hours at 150 to 160° C. and finally for 5 hours at 170 to 180° C. The reaction mixture is then cooled to 120° C., whereupon under a microscope only uniform orange-red crystal clusters can be detected. The whole is suction-filtered, and the residue is washed with hot nitrobenzene and hot alcohol and dried under vacuum at 90 to 100° C., to yield 26 parts of a quinacridone pigment which after conventional conditioning and fine dispersion produces in polyvinylchloride foils very fast yellowish red tints.

What is claimed is:

1. A process for the production of 7,14-dioxo-5,7,12,14-tetrahydroquinolino-[2,3-b]-acridines which comprises heating a 2,5-dianilinoterephthalic acid which must be unsubstituted in a position ortho to the amino group of each aniline radical and which is selected from the group consisting of unsubstituted 2,5-dianilinoterephthalic acid, 2,5-dianilinoterephthalic acids bearing halogen atoms on the aniline radical, 2,5-dianilinophthalic acids bearing lower alkoxy groups on the aniline radical, 2,5-dianilinophthalic acids bearing nitro groups on the aniline radical and 2,5-dianilinoterephthalic acids bearing lower alkyl groups on the aniline radical, with benzoyl chloride in the presence of a high boiling inert diluent.

2. A process as claimed in claim 1, wherein benzoyl chloride is used.

3. A process as claimed in claim 1, wherein at least two mols of the benzene-carboxylic acid halide are used for each mol of 2:5-diphenylamino-terephthalic acid.

4. A process as claimed in claim 1, wherein 2 to 3 mols of the benzene-carboxylic acid halide are used for each mol of 2:5-diphenylamino-terephthalic acid.

5. A process as claimed in claim 1, wherein the reaction is carried out at a temperature of at least 100° C.

6. A process as claimed in claim 1, wherein the reaction temperature is within the range of 130° C. to 250° C.

7. A process for the manufacture of the linear quinacridone which comprises heating one mol of the 2,5-diphenylamino-terephthalic acid at a temperature within the range of 130–250° C. with 2 to 3 mols of benzoyl chloride in the presence of a high boiling inert diluent.

References Cited by the Examiner

FOREIGN PATENTS 1,244,061   12/1959   France.

OTHER REFERENCES

Liebermann: Liebig's Annalen, vol. 518, pp. 245–259 (1935).

MacArdle: Use of Solvents, pp. 1–3 (1925).

ALEX MAZEL, *Primary Examiner.*

IRVING MARCUS, DUVAL T. McCUTCHEN, HENRY R. JILES, *Examiners.*

DON M. KERR, DONALD G. DAUS,
*Assistant Examiners.*